US012739327B2

(12) United States Patent
Lee et al.

(10) Patent No.: US 12,739,327 B2
(45) Date of Patent: Sep. 15, 2026

(54) CHANGING MODEL NAME ACCORDING TO PROVIDED FUNCTION

(71) Applicant: Hewlett-Packard Development Company, L.P., Spring, TX (US)

(72) Inventors: Kwangwoo Lee, Seongnam Si (KR); Junho Yoon, Seongnam Si (KR); Jaein Lee, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 287 days.

(21) Appl. No.: 18/704,181

(22) PCT Filed: Apr. 19, 2022

(86) PCT No.: PCT/US2022/025279

§ 371 (c)(1),
(2) Date: Apr. 24, 2024

(87) PCT Pub. No.: WO2023/075835

PCT Pub. Date: May 4, 2023

(65) Prior Publication Data

US 2024/0422269 A1 Dec. 19, 2024

(30) Foreign Application Priority Data

Oct. 28, 2021 (KR) ........................ 10-2021-0145851

(51) Int. Cl.
*H04N 1/00* (2006.01)

(52) U.S. Cl.
CPC ..... *H04N 1/00082* (2013.01); *H04N 1/00037* (2013.01); *H04N 1/00204* (2013.01); *H04N 2201/0094* (2013.01)

(58) Field of Classification Search
CPC ........... H04N 1/00082; H04N 1/00037; H04N 1/00204; H04N 2201/0094; G06F 3/1203
See application file for complete search history.

(56) References Cited

U.S. PATENT DOCUMENTS

| | | | | |
|---|---|---|---|---|
| 8,031,353 | B2 | 10/2011 | Miyata | |
| 8,051,434 | B2 | 11/2011 | Miyata | |
| 2006/0109505 | A1 | 5/2006 | Ha et al. | |
| 2006/0265661 | A1* | 11/2006 | Ball | G06F 9/4415 715/734 |
| 2009/0063710 | A1 | 3/2009 | Sekine et al. | |
| 2010/0103450 | A1 | 4/2010 | Yanazume | |
| 2010/0241660 | A1* | 9/2010 | Bhorania | G06F 3/1203 707/E17.014 |
| 2015/0092233 | A1 | 4/2015 | Park et al. | |

FOREIGN PATENT DOCUMENTS

| | | |
|---|---|---|
| EP | 2031498 A1 | 3/2009 |

* cited by examiner

*Primary Examiner* — John R Wallace
(74) *Attorney, Agent, or Firm* — Foley & Larnder LLP

(57) ABSTRACT

An example image forming device includes a processor and a memory to store instructions executable by the processor. The processor is to execute the instructions to identify a first model name of the image forming device and a fixed name of the image forming device, identify functions provided by the image forming device, identify a second model name of the image forming device, according to rules set according to the fixed name, based on the functions provided by the image forming device, and change the first model name to the second model name.

9 Claims, 8 Drawing Sheets

Printers (8)

HP Universal Printing PCL 6

HP LaserJet MFP E82650

HPSECUREPRINT

CHANGING MODEL NAME ACCORDING TO PROVIDED FUNCTION

BACKGROUND

A manufacturer of an image forming device may plan and produce related products with differences in provided functions in order to satisfy various requirements of customers and effectively reduce manufacturing costs. The manufacturer may select a model name of the related products according to differences in functions provided by products and assign the model names to the products.

BRIEF DESCRIPTION OF THE DRAWINGS

Various examples will be described below by referring to the following figures.

FIG. 1 is a conceptual view for describing a method by which a host device displays a name of an image forming device according to an example.

DETAILED DESCRIPTION

Figure 2:
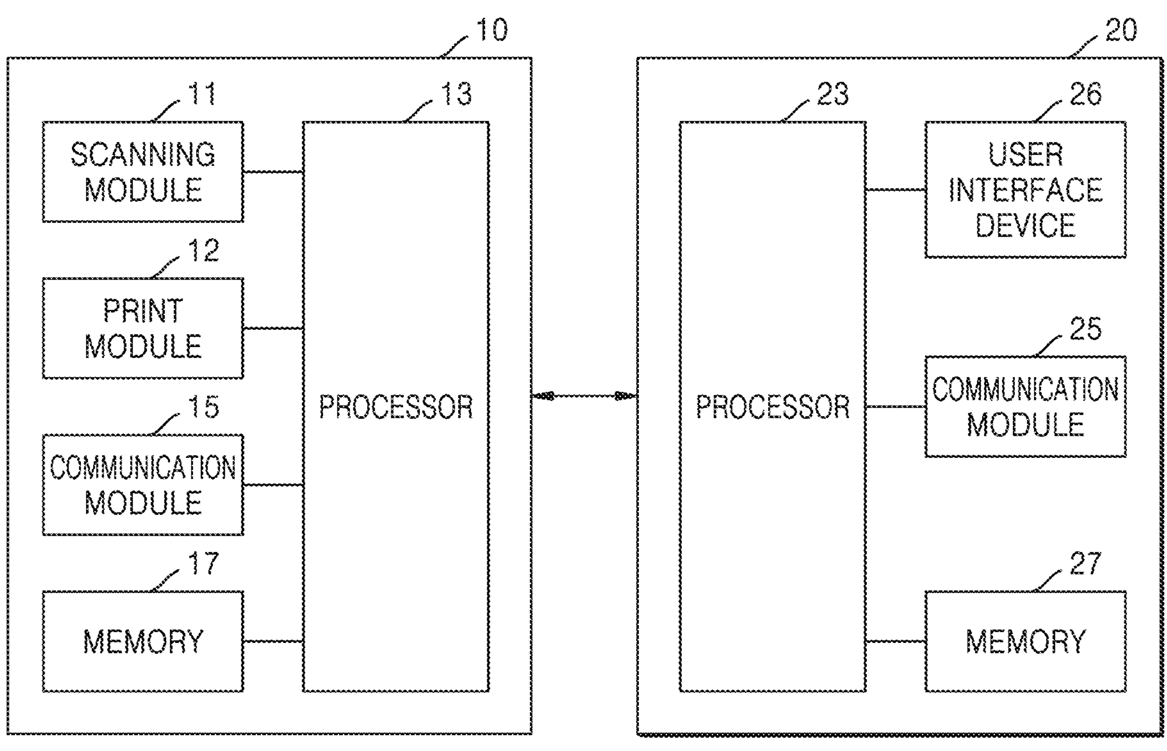
FIG. 2 is a block diagram for describing a host device and an image forming device according to an example.

An image forming device may have a model name assigned at the time of manufacture. In a case where a function provided by the image forming device changes, the model name assigned to the image forming device may not match the function provided by the image forming device.

In an example, in a case where a function provided by an image forming device changes, the model name of the image forming device may be automatically changed. Also, in a case where a function provided by the image forming device changes, a display name of the image forming device registered in a host device may be automatically changed.

Various examples provide an image forming device to change a model name according to a provided function, a host device to change a display name according to the model name of the image forming device, and a non-transitory computer-readable storage medium related to the image forming device and the host device. In an example, an image forming device may include a processor and a memory to instructions executable by the processor. The processor may execute the instructions to identify a first model name of the image forming device and a fixed name of the image forming device, identify functions provided by the image forming device, identify a second model name of the image forming device, according to rules set according to the fixed name, based on the functions provided by the image forming device, and change the first model name to the second model name.

According to the following disclosed examples, an image forming device may identify that a function provided by the image forming device has changed, and may change a model name of the image forming device to match the identified function provided by the image forming device. A host device may change a display name registered in the host device to match the model name of the image forming device connected to the host device. A user may easily identify the function provided by the image forming device from the display name of the image forming device. Also, convenience is improved because the user does not need to directly change the display name in a case where the function provided by the image forming device has changed.

A "host device" as used herein refers to a device capable of transmitting content for an image forming job to the image forming device. Examples of the host device may include a personal computer (PC), a smartphone, a tablet, a laptop computer, or the like. The user may perform a document function by executing an application installed in the host device, may perform a print function provided by the application, and may transmit a document to be printed to the image forming device.

An "image forming device" as used herein refers to a device capable of performing an image forming job such as a printer, a copier, a scanner, a multi-function printer, or a fax machine. The image forming job may refer to any of various image-related jobs, for example, printing, copying, scanning, faxing, or a function related thereto, and may include a series of processes used to perform the image forming job.

A "fixed name of the image forming device" as used herein refers to a name commonly assigned to related products that are planned and produced together by a manufacturer of the image forming device. The fixed name of the image forming device does not change after the image forming device is manufactured.

A "model name of the image forming device" as used herein refers to a product name assigned by the manufacturer of the image forming device, based on at least one function provided by the image forming device. As the at least one function provided by the image forming device changes, the model name of the image forming device may change. For example, a function provided by the image forming device may change in a case where an extension function module, a license, machine readable instructions connected to the image forming device, or the like change. Based on the changed function of the image forming device, the model name of the image forming device may change according to a pre-determined rule.

A "display name of the image forming device" as used herein refers to a name of the image forming device registered in the host device. The display name of the image forming device may be selected to be a static value. The display name of the image forming device may be registered in a registry of an operating system of the host device. The display name of the image forming device may be identified based on a driver of the image forming device being installed in the host device. For example, the display name of the image forming device may be identified to be the model name of the image forming device based on the driver of the image forming device being installed in the host device. As at least one function provided by the image forming device changes, the display name of the image forming device may change.

A "function provided by the image forming device" as used herein refers to a function related to a process in which the image forming device performs image forming, printing, or the like. For example, the function provided by the image forming device may include a printing speed, a double-sided printing function, an ink/toner saving function, a finisher function, or the like related to image forming. As an example, the function provided by the image forming device may include an automatic feeding function, a double-sided scanning function, a fax function, or the like related to scanning. Also, the function provided by the image forming device may include a wireless network connection function related to a network.

A "unique identification value of the image forming device" as used herein refers to a unique value generated with numbers and/or characters assigned by the manufacturer of the image forming device to identify the image forming device. The unique identification value of the image forming device may include, for example, a serial number.

"Identification information of the image forming device" as used herein refers to information used by an external device to identify the image forming device. The identification information of the image forming device may include at least one of a fixed name, a model name, a unique identification value, or the like of the image forming device. The identification information of the image forming device may include information corresponding to a query received by the image forming device.

A "function extension module of the image forming device" as used herein refers to a hardware module for providing an additional function related to a function provided by the image forming device. For example, the function extension module may include an automatic feeding module, a network module, a fax module, an external storage device connection module, or the like.

A "license" as used herein refers to a use condition in which a limited function is provided by machine readable instructions in accordance with costs paid by the image forming device. For example, the license may include a use condition related to a printing speed of the image forming device and a use condition related to an ink/toner saving function.

"Firmware" as used herein refers to machine readable instructions for driving hardware of the image forming device and controlling a function of the hardware. As the firmware of the image forming device changes, a function supported by the image forming device may change.

A "driver" as used herein refers to machine readable instructions through which an operating system (OS) of the host device may interact with the image forming device. The host device may recognize the image forming device through the driver, and may control the image forming device. The host device may obtain status information of the image forming device by using the driver. The host device may generate print data of a document requested by the user to be printed by using the driver.

"Status information of the image forming device" may include information about a status of the image forming device. The status information of the image forming device may include information about an operation status (e.g., a waiting status, a print status, a scan status, etc.) of the image forming device, information about an error (e.g., paper jam, out of paper, a cartridge error, etc.) occurring in the image forming device, information about a function provided by the image forming device, or the like. The status information of the image forming device may include information about a page that is being printed by the image forming device. The information about the error with the cartridge may include information about the lack of toner or ink contained in the cartridge. The cartridge may refer to a container in which toner or ink used by the image forming device to form an image is contained. The cartridge may be manufactured as a detachable component of the image forming device, so that the user easily replaces toner or ink.

"Print data" as used herein refers to a printing command that depicts an image generated by the host device by using standard functions in response to a print request from the user. The print data may include page description language (PDL) data obtained by encoding a printing command in a description language by the host device. The print data may include a printer job language (PJL) related to print settings of the image forming device. The print data may include pixel information of an image (e.g., information indicating whether a pixel corresponds to an image, graphic, or text). The print data may be transmitted from the host device to the image forming device. The image forming device may generate image information by performing rendering by using the print data. The print data may be generated by the driver installed in the host device.

Figure 1:
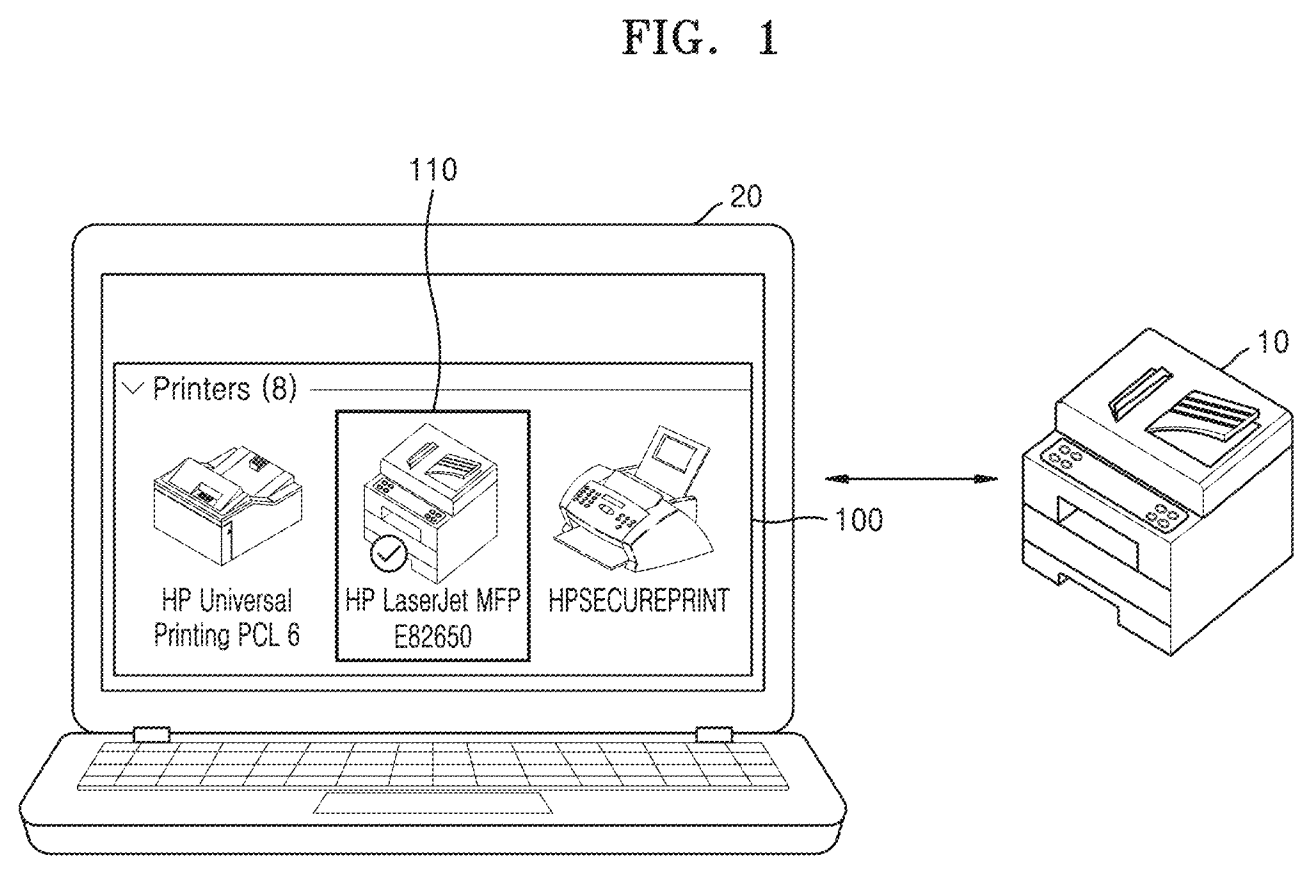

FIG. 1 is a conceptual view for describing a method by which a host device displays a name of an image forming device according to an example.

Referring to FIG. 1, a host device 20 may be connected to an image forming device 10. Although the example of FIG. 1 shows the host device 20 connected to one image forming device 10, in other examples, the host device 20 connected to a plurality of image forming devices 10. The host device 20 may identify the image forming device 10 connected to the host device 20. The host device 20 may register the image forming device 10 in the host device 20. The host device 20 may generate a list 100 of registered image forming devices. The host device 20 may identify a display name of an image forming device 110 included in the list 100 based on a model name of the image forming device 10 received from the image forming device 10. The host device 20 may display the image forming device 110 included in the list 100 as the display name.

The host device 20 may change the display name of the image forming device 110 included in the list 100. The host device 20 may change the display name of the image forming device 110 to match the model name of the image forming device 10. The model name of the image forming device 10 may be identified based on functions provided by the image forming device 10.

The image forming device 10 may change the model name of the image forming device 10 based on a change in a function provided by the image forming device 10. The image forming device 10 may change a first model name that is a current model name of the image forming device 10 to a new second model name.

The first model name of the image forming device 10 may be a name assigned at the time that the image forming device 10 was manufactured. Alternatively, the first model name of the image forming device 10 may be a model name changed according to an example method described below based on functions provided by the image forming device 10.

The second model name of the image forming device 10 may be a model name newly identified according to rules set according to a fixed name of the image forming device 10 based on functions supported by the image forming device 10. The image forming device 10 may identify that a function provided by the image forming device 10 has been changed based on a change in a function extension module connected to the image forming device 10, firmware of the image forming device 10, a license related to functions provided by the image forming device 10, or the like. The image forming device 10 may identify the second model name of the image forming device 10 based on the changed function.

The image forming device 10 may compare the first model name with the second model name. The image forming device 10 may change the first model name to the second model name in a case where the first model name and the second model name are different from each other.

The image forming device 10 may transmit identification information of the image forming device 10 to the host device 20 based on a connection with the host device 20. The image forming device 10 may receive a query requesting the identification information of the image forming device 10 from the connected host device 20. The image forming device 10 may generate the identification information of the image forming device 10 in response to the query. The identification information of the image forming device 10 may include a unique identification value of the image forming device 10 and the second model name of the image forming device 10.

The host device 20 may identify the image forming device 10 connected to the host device 20. The host device 20 may generate the query requesting the identification information of the connected image forming device 10 and may transmit the query to the image forming device 10. The host device 20 may receive the identification information of the image forming device 10 generated in response to the query from the image forming device 10. The identification information of the image forming device 10 may include the unique identification value of the image forming device 10 and the model name of the image forming device 10.

The host device 20 may identify whether the connected image forming device 10 is registered in the host device 20. For example, the host device 20 may identify whether the image forming device 10 is registered in the host device 20 by identifying a unique identification value corresponding to the unique identification value of the image forming device 10 from among unique identification values of image forming devices pre-registered in the host device 20.

The host device 20 may identify a display name of the image forming device 10 registered in the host device 20. For example, the host device 20 may match a unique identification value and a display name of an image forming device and may register the unique identification value and the display name of the image forming device. The host device 20 may identify the display name corresponding to the unique identification value of the image forming device 10.

In order for the host device 20 to change the display name of the image forming device 10 to match the model name of the image forming device 10, the host device 20 may compare the model name of the image forming device 10 with the display name of the image forming device 10 registered in the host device 20. The host device 20 may change the display name to the model name based on a result of the comparison between the model name and the display name. For example, the host device 20 may change a display name of an image forming device in the list stored in a memory to a model name received from the image forming device. The host device 20 may change a display name of an image forming device registered in a registry of an operating system of the host device 20 to a model name received from the image forming device. The host device 20 may identify a change of a first function from among functions provided by the image forming device 10 based on the change of the display name. The host device 20 may control a driver installed in the host device 20 to correspond to the changed first function.

The host device 20 may display the list 100 including the image forming device 110 having the changed display name. The host device 20 may display the list 100 stored in the memory.

The host device 20 may transmit and receive data to and from a server to change a function provided by the image forming device 10. For example, the host device 20 may receive firmware for changing at least one of functions provided by the image forming device 10 from the server. In another example, the host device 20 may transmit and receive data for changing a license of the first function from among functions supported by the image forming device 10 to and from the server.

The host device 20 may generate control data for changing a function provided by the image forming device 10. For example, the host device 20 may generate control data including firmware for changing at least one function provided by the image forming device 10. In another example, the host device 20 may generate control data for changing the license of the first function of the image forming device 10 by using payment completion data received from the server. The host device 20 may transmit the generated control data to the image forming device 10.

The host device 20 may change the display name of the image forming device 10 having the changed function. The host device 20 may re-identify the connection with the image forming device 10 having the changed function. For example, the host device 20 may re-identify the connection with the image forming device 10 in which the firmware transmitted by the host device 20 is installed. In another example, the host device 20 may re-identify the connection with the image forming device 10 having the changed license of the first function. The host device 20 may transmit a query requesting the identification information of the image forming device 10 to the image forming device 10, and may receive the identification information of the image forming device 10 generated in response to the query from the image forming device 10. The host device 20 may change the display name of the image forming device 10 to the model name of the image forming device 10 identified from the received identification information of the image forming device 10.

The host device 20 may receive a print command for content from a user. The host device 20 may generate a print job for the content in response to the print command, and may generate print data corresponding to the print job. For example, the host device 20 may generate the print job for the content by using the driver installed in the host device 20, and may generate the print data by encoding the content in a PDL. The host device 20 may generate a name of the print job based on a name of a file to be printed.

The host device 20 may transmit the print data to the image forming device 10. The print data may include PDL data, PJL data, and pixel information of an image. The image forming device 10 may perform the print job by using the print data. The image forming device 10 may print the content by using the PDL data included in the print data.

The image forming device 10 may transmit status information of the image forming device 10 to the host device 20 by using the driver. As an example, the image forming device 10 may transmit, to the host device 20, information about an operation status (e.g., a waiting state, a print status, a scan status, etc.) of the image forming device 10 and information about an error (e.g., paper jam, out of paper, a cartridge error, etc.) occurring in the image forming device 10.

The host device 20 may generate notification information including the status information of the image forming device 10. The host device 20 may generate the notification information including information about the print job. The host device 20 may display the notification information. The host device 20 may display the notification information by using the changed display name of the image forming device 10.

FIG. 2 is a block diagram for describing a host device and an image forming device according to an example.

Referring to FIG. 2, the image forming device 10 and the host device 20 may transmit and receive data to and from each other.

The image forming device 10 may include a scanning module 11, a print module 12, a communication module 15, a memory 17, and a processor 13. However, the image forming device 10 may include more or fewer elements than those of the image forming device 10 illustrated in FIG. 2. For example, the image forming device 10 may further include a user interface device (not shown) through which a user receives an input to control the image forming device 10. In another example, the image forming device 10 may further include a display device (not shown) to display information about the image forming device 10.

The scanning module 11 may scan an image recorded on a document by emitting light to the document and receiving light reflected from the document. The scanning module 11 may scan an output printed from the image forming device 10.

The print module 12 may form and print an image on a print medium through any of various printing methods such as an electrophotographic method, an inkjet method, or the like. The print module 12 may include a cartridge 12-1 in which toner or ink for forming an image on the print medium is contained.

The communication module 15 may transmit and receive data to and from an external device such as the host device 20, a server 30, a network, or the like. For example, the communication module 15 may receive print data from the external device. The communication module 15 may perform wired communication such as Ethernet, universal serial bus (USB), high-definition multimedia interface (HDMI), or the like. The communication module 15 may perform wireless communication such as wireless fidelity (Wi-Fi), Wi-Fi direct, Bluetooth, ultra-wideband (UWB), near-field communication (NFC), or the like. The communication module 15 may perform a fax function by transmitting an output image obtained by the scanning module 11 to an external fax device or receiving print data from the external fax device so that the print module 12 may print the print data.

The memory 17 may store various types of data such as a file and a program such as applications. The memory 17 may store at least one instruction and at least one program for processing and controlling of the processor 13. The memory 17 may store information about a status of the image forming device 10.

The memory 17 may include at least one type of storage medium from among a memory in which data is temporarily stored such as a random-access memory (RAM), a static random-access memory (SRAM), or the like and a data storage in which data is non-temporarily stored such as a flash memory, a read-only memory (ROM), or the like. The memory 17 may include a memory chip.

The processor 13 may include at least one processing unit such as a central processing unit (CPU). Also, the processor 13 may include at least one specialized processing unit corresponding to each function.

The processor 13 may control the scanning module 11, the print module 12, the communication module 15, and the memory 17 to provide examples described with reference to FIGS. 1 and 3 through 8, by executing at least one instruction stored in the memory 17.

The processor 13 may access and use data stored in the memory 17, or may store new data in the memory 17. The processor 13 may execute a program stored in the memory 17. The processor 13 may store a file or a program received from the outside through the communication module 15 in the memory 17.

The host device 20 may include a user interface device 26, a communication module 25, a memory 27, and a processor 23. However, the may include more or fewer elements than those of the host device 20 illustrated in FIG. 2.

The user interface device 26 may include an input device to receive an input of the user or the like and an output device to display a document to be printed. For example, the user interface device 26 may include a combination of an output device such as a monitor and an input device such as a keyboard, a touchpad, a mouse, or the like, or may include a touchscreen.

The communication module 25 of the host device 20 may transmit and receive data to and from an external device such as the image forming device 10, an external server, a network, or the like. For example, the communication module 25 may transmit print data to the image forming device 10. The communication module 25 may perform wired communication such as Ethernet, USB, HDMI, or the like. The communication module 25 may perform wireless communication such as Wi-Fi, Wi-Fi direct, Bluetooth, UWB, NFC, or the like.

The memory 27 may store various types of data such as a file and a program such as an operating system (OS) and an application. The memory 27 may store at least one instruction and at least one program for processing and control of the processor 23.

The memory 27 may include at least one type of storage medium from among a memory in which data is temporarily stored such as a RAM or an SRAM and a data storage in which data is non-temporarily stored such as a flash memory or a ROM.

The processor 23 may include at least one processing unit such as a CPU. Also, the processor 23 may include at least one specialized processing unit corresponding to each function.

The processor 23 may control the user interface device 26, the communication module 25, and the memory 27 to provide examples described with reference to FIGS. 1 and 3 through 8, by executing at least one instruction stored in the memory 27.

The processor 23 may generate control data for controlling an operation of the image forming device 10. The processor 23 may generate print data, so that the image forming device 10 performs an image forming job. For example, the processor 23 may generate a page description file of a document to be printed, according to a print request through an application, by executing instructions stored in the memory 27. The processor 23 may execute a program for checking the image forming device 10.

Figure 3:
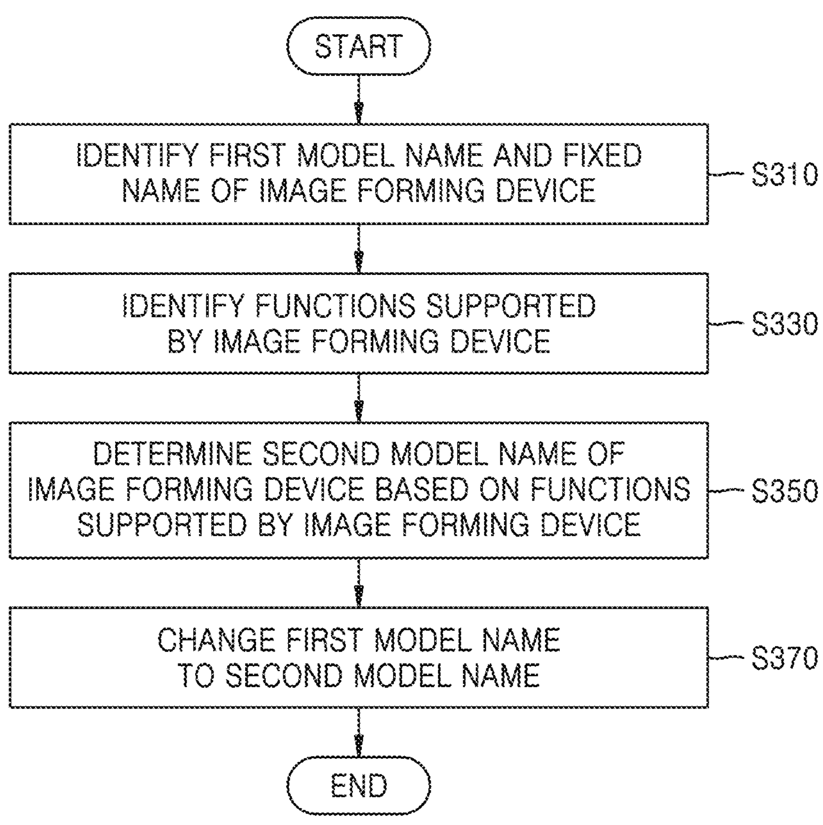
FIG. 3 is a flowchart illustrating a method by which an image forming device changes a model name according to an example.

FIG. 3 is a flowchart illustrating a method by which an image forming device changes a model name according to an example.

Each of operations of FIG. 3 may be performed by using instructions executable by a processor. Also, the instructions may be stored in a non-transitory storage medium readable by a computer including the processor.

In operation S310, an image forming device may identify a first model name and a fixed name of the image forming device. In operation S310, the first model name of the image forming device refers to a current model name of the image forming device.

The image forming device may read out the current model name of the image forming device and the fixed name of the image forming device stored in a non-transitory memory of the image forming device. The image forming device may read out the model name and the fixed name of the image forming device at a pre-determined time (e.g., based on power of the image forming device being turned on, based on the image forming device being connected to a host device, etc.).

The fixed name of the image forming device may be assigned by a manufacturer during production of the image forming device. The fixed name of the image forming device does not change after being assigned by the manufacturer. The model name of the image forming device may be a model name that is assigned by the manufacturer during production of the image forming device, or changed according to the following example operations. The model name of the image forming device may change based on a function provided by the image forming device.

In operation S330, the image forming device may identify functions supported by the image forming device.

The image forming device may identify a change in a function related to a process in which the image forming device performs image forming and performs printing. For example, the image forming device may identify a change in a function provided by the image forming device by identifying whether a function extension module changes, firmware of the image forming device changes, whether a license related to functions provided by the image forming device changes, or the like.

The image forming device may identify whether a hardware module to provide an additional function related to a function supported by the image forming device changes. For example, the image forming device may identify whether an automatic feeding module is added or removed. The image forming device may identify whether a double-sided scanning module is added or removed. The image forming device may identify whether a network module to form a wireless network is added or removed. The image forming device may identify whether a fax module to perform a fax function is added or removed. The image forming device may identify whether an external storage device connection module to connect an external storage device (e.g., a USB memory, a secure digital (SD) memory, etc.) is added or removed.

The image forming device may identify whether the firmware of the image forming device changes. The image forming device may replace first firmware installed in the image forming device with second firmware received from the host device and/or a server. The image forming device may identify whether the firmware installed in the image forming device changes by using a version of the firmware. For example, the image forming device may identify whether the firmware of the image forming device changes by comparing information about a version of firmware of the image forming device stored in the non-transitory memory with the firmware installed in the image forming device. The image forming device may identify whether a function provided by the image forming device changes due to the change of the firmware from a changed feature included in the firmware. For example, the image forming device may identify whether a function of performing optical character recognition (OCR) is added from a scanned image due to the change of the firmware.

The image forming device may identify whether the license of the image forming device changes. In an example, the image forming device may identify whether the license of the image forming device changes by receiving data about a changed part of a license related to a function provided by the image forming device from the host device and/or the server. As an example, the image forming device may receive data about a changed part of a license related to a printing speed of the image forming device. The image forming device may receive data about a changed part of a license related to the use of an ink/toner saving function. The image forming device may identify whether a function provided by the image forming device changes from the data about the changed part of the license.

In operation S350, the image forming device may identify a second model name of the image forming device based on functions supported by the image forming device.

The image forming device may identify the second model name of the image forming device based on the functions identified in operation S330. The image forming device may identify the second model name of the image forming device according to rules set according to the fixed name. The rules may be selected by the manufacturer of the image forming device during planning and production of a series product of the image forming device.

For example, the model name of the image forming device may be identified based on rules in which information about the performance of the automatic feeding module is located before the fixed name and information about the printing speed is located after the fixed name. As an example, in a case where the fixed name of the image forming device is E877, the model name of the image forming device to which the automatic feeding module having a printing speed of 40 PPM, a feeding speed of 90/180 ipm, and a feeding capacity of 200 sheets is coupled may be determined to be MFP E87740. Also, the model name of the image forming device in which the license having a printing speed of 60 ppm is installed may be determined to be MFP 87760. Also, the model name of the image forming device to which the automatic feeding module having a feeding speed of 150/300 ipm and a feeding capacity of 300 sheets is coupled may be determined to be Flow E87760.

Also, the model name of the image forming device may be identified based on rules in which information of about the function extension module is located after the fixed name. As an example, in a case where the fixed name of the image forming device is E877, the model name of the image forming device to which the network module and the automatic feeding module having a printing speed of 40 PPM, a feeding speed of 90/180 ipm, and a feeding capacity of 200 sheets are coupled may be determined to be MFP E87740N. Also, the model name of the image forming device to which the fax module is additionally coupled may be determined to be MFP E87740FN. Also, the model name of the image forming device in which an ink/toner saving license is installed may be determined to be MFP E87740EFN. Also, the model name of the image forming device in which a solution extension license is installed may be determined to be MFP E87740EFNX. The model name of the image forming device in which a license having a printing speed of 60 ppm is additionally installed may be determined to be MFP E87760EFNX.

In operation S370, the image forming device may change the first model name to the second model name.

The image forming device may change the first model name identified in operation S310 to the second model name identified in operation S350. For example, in a case where a license having a printing speed of 60 ppm is additionally installed, the image forming device may change MFP E87740, which is the first model name of the image forming device that has the fixed name of E877 and to which the automatic feeding module having a printing speed of 40 PPM, a feeding speed of 90/180 ipm, and a feeding capacity of 200 sheets is coupled, to MFP E87760.

The image forming device may store the second model name that is the changed model name in the non-transitory memory of the image forming device.

The image forming device may generate identification information of the image forming device including the second model name. The image forming device may generate the identification information of the image forming device based on a result obtained after identifying a connection with the host device. For example, the image forming device may identify the connection with the host device based on a query received from the host device. The image forming device may generate the identification information of the image forming device including the second model name in response to the query requesting the identification information of the image forming device. The image forming device may transmit the identification information of the image forming device to the host device in response to the query received from the host device. For example, the image forming device may transmit the identification information of the image forming device to the host device by using a simple network management protocol (SNMP), a web service (WS) interface, an embedded web server (EWS), a web service on device (WSD) protocol, or the like.

Figure 4:
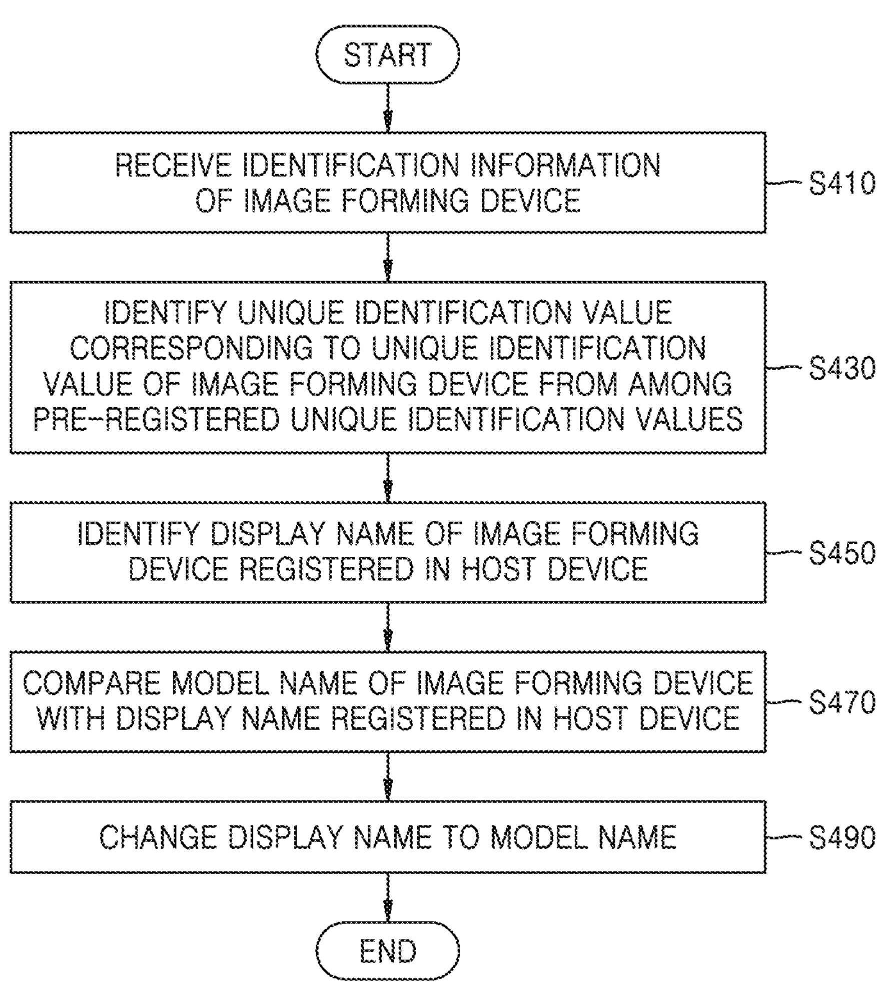
FIG. 4 is a flowchart illustrating a method by which a host device changes a display name of an image forming device according to an example.

FIG. 4 is a flowchart illustrating a method by which a host device changes a display name of an image forming device according to an example. Each of operations of FIG. 4 may be performed by using instructions executable by a processor. Also, the instructions may be stored in a non-transitory storage medium readable by a computer including the processor.

In operation S410, a host device may receive identification information of an image forming device. The host device may receive the identification information of the image forming device from the image forming device based on an event occurring and/or at every pre-determined cycle.

The host device may transmit a query requesting identification information to a first image forming device connected to the host device. The host device may transmit the query to the image forming device by using a discovery protocol using USB, WSD, TCP/IP (SNMP), or the like. The host device may receive the identification information of the first image forming device through SNMP, MIB/OID query, or WebService API.

Based on an event occurring, the host device may transmit the query requesting the identification information of the first image forming device to the first image forming device. For example, the host device may transmit the query to the image forming device based on the host device being connected to the image forming device.

The host device may receive the identification information generated in response to the query from the first image forming device. The identification information of the first image forming device may include information corresponding to the query received by the first image forming device. The identification information of the first image forming device may include at least one of a fixed name, a model name, a unique identification value of the first image forming device, or the like.

In operation S430, the host device may identify a unique identification value corresponding to a unique identification value of the image forming device from among unique identification values pre-registered in the host device.

The host device may obtain a first unique identification value of the first image forming device from the identification information of the first image forming device received in operation S410.

The host device may obtain the unique identification value of the image forming device registered in the host device. For example, the host device may read out the unique identification value of the image forming device from a list of image forming devices registered in the host device, stored in a non-transitory memory of the host device.

The host device may identify a second unique identification value corresponding to the first unique identification value by comparing the first unique identification value with unique identification values of image forming devices pre-registered in the host device.

In operation S450, the host device may identify a display name of the image forming device registered in the host device. The host device may identify the display name of the image forming device registered in the host device based on the second unique identification value obtained in operation S430.

The host device may register the display name of the image forming device and the unique identification value of the image forming device together. For example, the host device may generate a list in which the unique identification value of the image forming device matches the display name of the image forming device, and may store the list in the non-transitory memory of the host device. The list generated by the host device may be a printer queue registered in a registry of an operating system of the host device.

The host device may identify the display name of the image forming device which is matched to the second unique identification value and registered. For example, the host device may read out the display name of the image forming device corresponding to the second unique identification value from the list stored in the non-transitory memory of the host device.

In operation S470, the host device may compare a model name of the image forming device with the display name registered in the host device.

The host device may obtain the model name of the first image forming device from the identification information of the first image forming device received in operation S410. The host device may compare the model name obtained from the identification information of the first image forming device with the display name of the image forming device identified in operation S450.

The host device may identify whether the model name of the first image forming device and the display name of the image forming device corresponding to the second unique identification value match each other based on a result of the comparing.

In operation S490, the host device may change the display name registered in the host device to the model name.

The host device may change the display name registered in the host device based on a result of the comparing between the model name of the first image forming device and the display name of the image forming device corresponding to the second unique identification value in operation S470. The host device may change the display name to the model name of the first image forming device based on a result that the model name of the first image forming device and the display name of the image forming device corresponding to the second unique identification value do not match each other.

The host device may register the changed display name in the host device. The host device may update the list by matching the changed display name to the second unique identification value and registering the same in the list. The host device may store the updated list in the non-transitory memory.

The list generated by the host device may be a printer queue registered in the registry of the operating system of the host device. For example, the host device may update the display name of the image forming device included in the printer queue.

The host device may identify that a first function from among functions provided by the image forming device has changed based on the change of the display name of the image forming device. The host device may update a driver installed in the host device to correspond to the changed first function. For example, in a case where a printing speed increases from 40 ppm to 60 ppm, the host device may update the driver to display that a printing speed of the image forming device is 60 ppm. The host device may transmit a generated control signal through the driver to the image forming device so that the image forming device outputs a printed page at a speed of 60 ppm.

Figure 5:
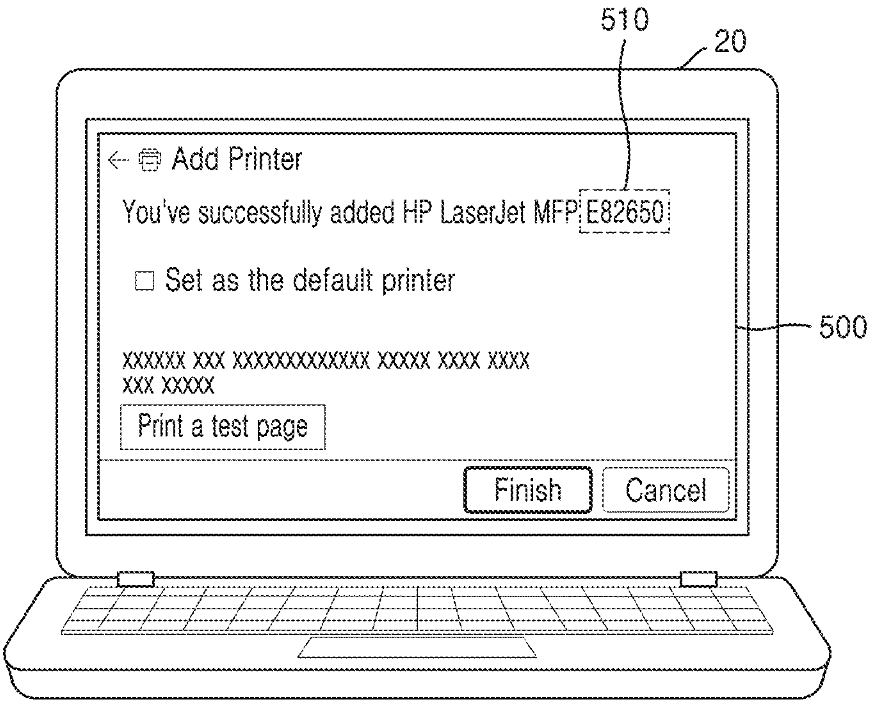
FIG. 5 is a view for describing a host device in which an image forming device is registered according to an example.

FIG. 5 is a view for describing a host device in which an image forming device is registered according to an example.

Referring to FIG. 5, the host device 20 may register an image forming device. For example, the host device 20 may register the image forming device by installing a driver of the image forming device in an operating system of the host device 20 by using a driver installation program 500. The host device 20 may register a plurality of image forming devices. The host device 20 may generate a list of the registered image forming devices, and may store the generated list in a non-transitory memory. The list generated by the host device 20 may be a printer queue registered in a registry of the operating system of the host device 20.

The host device 20 may identify image forming devices connected to the host device 20 by using the driver installation program 500. For example, the host device 20 may identify an image forming device connected to the host device 20 by using a discovery protocol such as USB, WSD, or TCP/IP (SNMP) through the driver installation program 500.

The host device 20 may obtain a model name and a unique identification value of the image forming device by using the driver installation program 500. In an example, the host device 20 may obtain the model name and the unique identification value of the image forming device by transmitting a query requesting the model name and the unique identification value of the image forming device to the image forming device by using the driver installation program 500. For example, the host device 20 may obtain the model name and the unique identification value of the image forming device by using an SNMP query. As an example, the host device 20 may obtain a model name of MFP E82650 from the image forming device that has a fixed name of E826 and to which an automatic feeding module having a printing speed of 50 PPM, a feeding speed of 90/180 ipm, and a feeding capacity of 200 sheets is coupled.

The host device 20 may display a list of model names of identified image forming devices. The host device 20 may install a driver of an image forming device selected in response to a user's input that selects an image forming device from the list.

The host device 20 may install the driver based on the obtained model name of the image forming device. The host device 20 may identify functions provided by the image forming device based on the model name of the image forming device, through the driver installation program 500. The host device 20 may install a driver to generate control data to perform functions provided by the image forming device. As an example, the host device 20 may install a driver to control the image forming device to automatically feed up to 200 sheets at a speed of 90/180 ipm and print an output at a printing speed of 50 PPM, based on MFP E82650 that is the model name of the image forming device.

The host device 20 may register the image forming device in the registry of the operating system. The host device 20 may identify the model name of the image forming device as a display name 510 of the image forming device registered in the registry. For example, the host device 20 may identify the model name of MFP E82650 obtained from the image forming device as the display name 510.

The host device 20 may match the display name 510 of the image forming device to the unique identification value of the image forming device and may store the same in the registry. The host device 20 may generate a list of registered image forming devices and may store the generated list in the non-transitory memory. The list generated by the host device 20 may be a printer queue.

Figure 6:
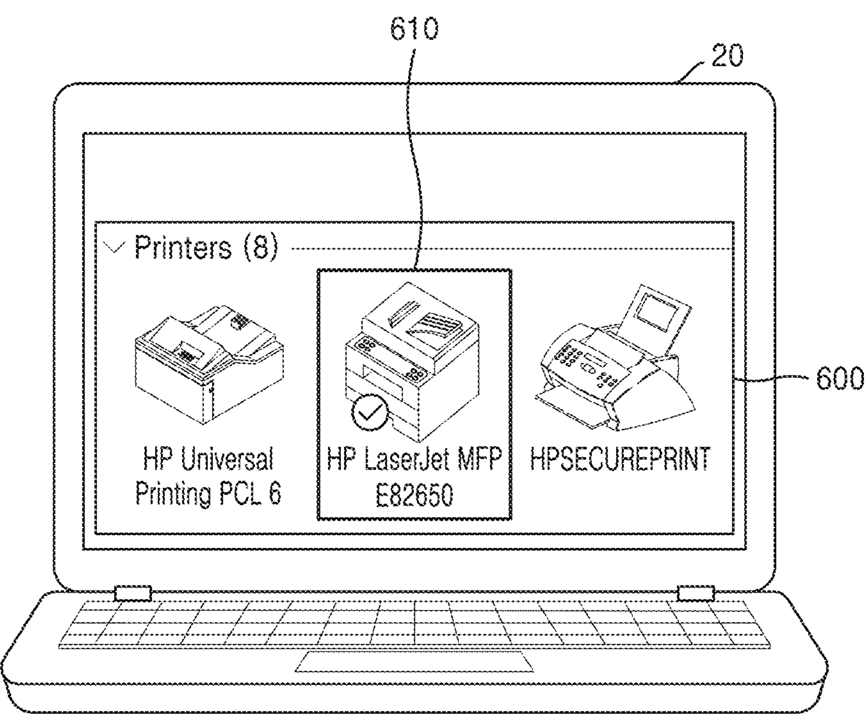
FIG. 6 is a view for describing a display name of an image forming device registered in a host device according to an example.

FIG. 6 is a view for describing a display name of an image forming device registered in a host device according to an example.

Referring to FIG. 6, the host device 20 may display a list 600 of image forming devices registered in the host device 20. For example, the host device 20 may display a printer queue.

The host device 20 may identify an image forming device 610 connected to the host device 20 from among the image forming devices registered in the host device 20. The host device 20 may display a display name of the image forming device 610 on the list 600. The display name of the image forming device 610 displayed on the host device 20 may be a display name registered based on a driver of the image forming device 610 being installed. For example, the display name of the image forming device 610 may be identified from a model name of MFP E82650 received from an image forming device that has a fixed name of E826 and to which an automatic feeding module having a printing speed of 50 PPM, a feeding speed of 90/180 ipm, and a feeding capacity of 200 sheets is coupled. The host device 20 may display MFP E82650 that is the display name registered by the image forming device 610.

Figure 7:
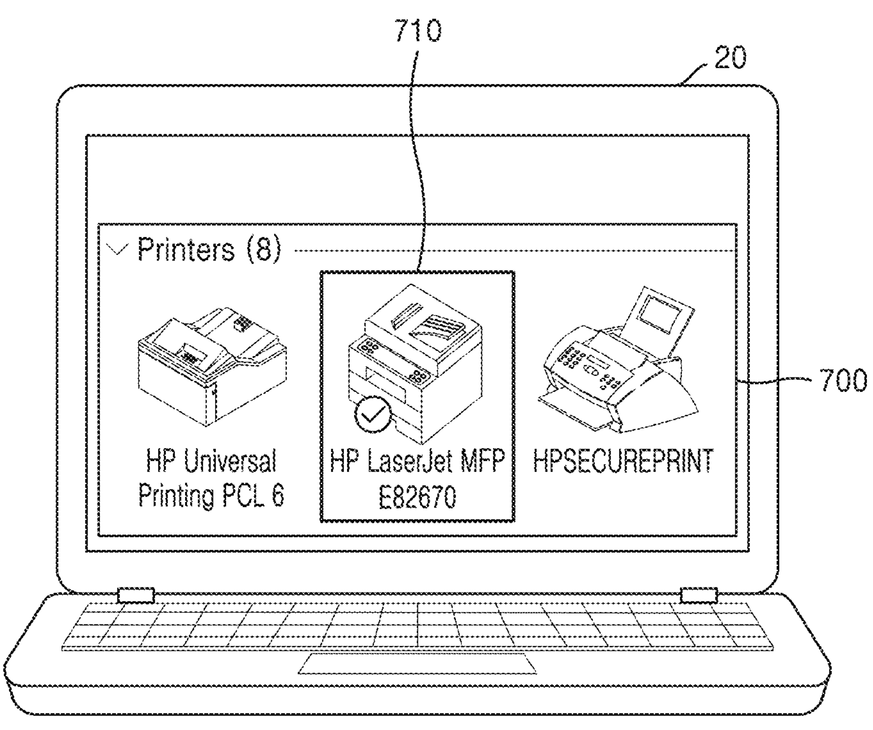
FIG. 7 is a view for describing a method by which a host device changes a display name of an image forming device according to an example.

FIG. 7 is a view for describing a method by which a host device changes a display name of an image forming device according to an example.

Referring to FIG. 7, an image forming device 710 may change a function provided by the image forming device 710. For example, the image forming device 710 may increase a printing speed from 50 PPM to 70 PPM. The image forming device 710 may increase a printing speed based on a change in firmware of the image forming device 710 received from a host device 20 and/or a server. Alternatively, the image forming device 710 may increase a printing speed based on a change in a license related to a printing speed of the image forming device 710 received from the host device 20 and/or the server.

The image forming device 710 may change a model name of the image forming device 710 based on a changed function. The image forming device 710 may change the model name of the image forming device 710, according to rules set according to a fixed name based on the changed function. For example, in a case where a printing speed changes from 50 PPM to 70 PPM, the image forming device 710 may change the model name from MFP E82650 to MFP E82670. An example method by which the image forming device 710 changes the model name based on the changed function has been described with reference to FIG. 3, and thus a repeated description will be omitted.

The host device 20 may change a display name of the image forming device 710 based on the model name changed by the image forming device based on the changed function. The host device 20 may identify whether the model name of the image forming device changes based on an event occurring and/or at every pre-determined cycle. The host device 20 may change the display name of the image forming device 710 registered in the host device 20 to the changed model name of the image forming device 710. For example, the host device 20 may change MFP E82650 that is the display name of the image forming device 710 registered in the host device 20 to MFP E82670 that is the model name of the image forming device 710. An example method by which the host device 20 changes the display name based on the changed function of the image forming device 710 has been described with reference to FIG. 4, and thus a repeated description will be omitted.

The host device 20 may display the changed display name of the image forming device 710. The host device 20 may display a list 700 of image forming devices including the changed display name of the image forming device 710. For example, the host device 20 may change the display name of the image forming device 710, whose printing speed changes from 50 PPM to 70 PPM, from MFP E82650 to MFP E82670 and may display the changed display name.

Figure 8:
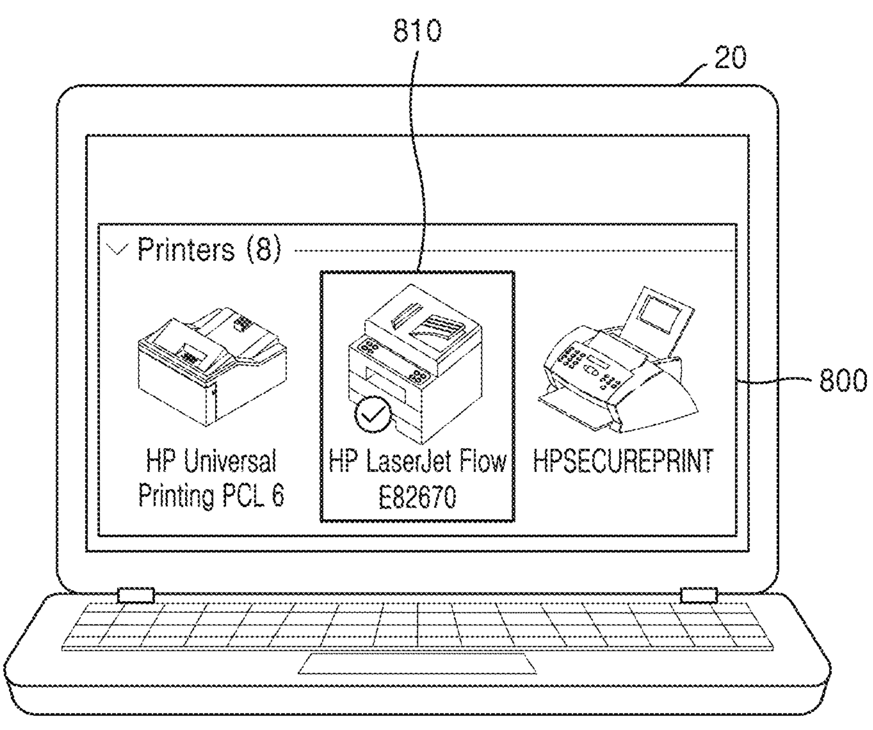
FIG. 8 is a view for describing a method by which a host device changes a display name of an image forming device according to an example.

FIG. 8 is a view for describing a method by which a host device changes a display name of an image forming device according to an example.

Referring to FIG. 8, an image forming device 810 may change a function provided by the image forming device 810 based on addition or removal of a function extension module. The image forming device 810 may identify whether the function extension module is added or removed in order to identify whether a function provided by the image forming device 810 changes. For example, the image forming device may identify whether an automatic feeding module is added or removed. The image forming device may identify whether a double-sided scanning module is added or removed. The image forming device may identify whether a network module to form a wireless network is added or removed. The image forming device may identify whether a fax module to perform a fax function is added or removed. The image forming device may identify whether an external storage device connection module to connect an external storage device (e.g., a USB memory, an SD memory, etc.) is added or removed.

The image forming device 810 may change a model name of the image forming device 810 based on a changed function. The image forming device 810 may change the model name of the image forming device 810, according to rules set according to a fixed name, based on the changed function. For example, in a case where an automatic feeding module having a feeding capacity of 200 sheets and a feeding speed of 90/180 ipm changes to an automatic feeding module having a feeding capacity of 300 sheets and a feeding speed of 150/300 ipm, the image forming device 810 may change the model name from MFP E82670 to Flow E82670. An example method by which the image forming device 810 changes the model name based on the changed function has been described with reference to FIG. 3, and thus a repeated description will be omitted.

The host device 20 may change a display name of the image forming device 810 based on the model name changed by the image forming device 810 based on the changed function. The host device 20 may identify whether the model name of the image forming device 810 changes based on an event occurring and/or at every pre-determined cycle. The host device 20 may change the display name of the image forming device 810 registered in the host device 20 to the changed model name of the image forming device 810. For example, the host device 20 may change MFP E82670 that is the display name of the image forming device 810 registered in the host device 20 to Flow E82670 that is the model name of the image forming device 810. An example method by which the host device 20 changes the display name based on the changed function of the image forming device 810 has been described with reference to FIG. 4, and thus a repeated description will be omitted.

The host device 20 may display the changed display name of the image forming device 810. The host device 20 may display a list 800 of image forming devices including the changed display name of the image forming device 810. For example, the host device 20 may change the display name of the image forming device MFP E82670 to Flow E82670 and may display Flow E82670.

Example operating methods of the image forming device 10 may be implemented in the form of a non-transitory computer-readable storage medium storing instructions or data executable by a computer or a processor. The examples may be written as computer-executable programs, and may be implemented in a general-purpose digital computer for executing such programs by using the non-transitory computer-readable storage medium. The non-transitory computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing machine readable instructions, associated data, data files, and data structures, and providing the machine readable instructions, associated data, data files, and data structures to a processor or a computer so that the processor or computer may execute the instructions.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming device comprising:

a processor; and a memory storing instructions executable by the processor, wherein the processor is to execute the instructions to:

identify a first model name of the image forming device and a fixed name of the image forming device, identify functions provided by the image forming device, identify a second model name of the image forming device, according to rules set according to the fixed name, based on the functions provided by the image forming device, and change the first model name to the second model name.

2. The image forming device of claim 1, wherein the processor is further to execute the instructions to:

identify a change in a function provided by the image forming device based on at least one of a function extension module connected to the image forming device, firmware of the image forming device, or a license related to the functions provided by the image forming device, and identify the second model name, based on the changed function.

3. The image forming device of claim 1, further comprising a communication module, wherein the processor is further to execute the instructions to:

control the communication module to receive control data about a change in a license of a first function from among functions supported by the image forming device, change the first function based on the received control data, and change the first model name to the second model name based on the changed first function.

4. The image forming device of claim 1, further comprising a communication module, wherein the processor is further to execute the instructions to: identify first firmware installed in the image forming device, control the communication module to receive control data comprising second firmware for changing a first function from among functions supported by the image forming device, replace the first firmware with the second firmware based on the received control data, and change the first model name to the second model name based on the changed first function.

5. The image forming device of claim 1, wherein the processor is further to execute the instructions to:

identify a connection of a function extension module to change a first function from among functions supported by the image forming device, change the first function based on the connected function extension module, and change the first model name to the second model name based on the changed first function.

6. The image forming device of claim 1, further comprising a communication module, wherein the processor is further to execute the instructions to:

identify a connection with a host device, generate identification information of the image forming device comprising the second model name and a unique identification value of the image forming device based on the connection with the host device, and control the communication module to transmit the generated identification information of the image forming device to the host device.

7. The image forming device of claim 6, wherein the processor is further to execute the instructions to:

control the communication module to receive a query requesting the identification information of the image forming device from the host device based on the connection with the host device, generate the identification information of the image forming device comprising the second model name in response to the query, and control the communication module to transmit the generated identification information of the image forming device to the host device.

8. A non-transitory computer-readable storage medium storing instructions executable by a processor of a computer, the non-transitory computer-readable storage medium comprising:

instructions to identify a fixed name of an image forming device and a first model name of the image forming device;

instructions to identify functions supported by the image forming device; instructions to identify a second model name of the image forming device, according to rules set according to the fixed name, based on the functions supported by the image forming device; and instructions to change the first model name to the second model name.

9. The non-transitory computer-readable storage medium of claim 8, wherein the instructions for identifying the functions supported by the image forming device comprise:

instructions to identify a change in a function provided by the image forming device based on at least one of a function extension module connected to the image forming device, firmware of the image forming device, or a license related to functions provided the image forming device, and instructions to change the first model name to the second model name comprise instructions for determining the second model name based on the changed function.

* * * * *